United States Patent [19]

Jorde

[11] Patent Number: 5,372,671
[45] Date of Patent: Dec. 13, 1994

[54] PORTABLE GROOVE GLUING MACHINE

[76] Inventor: Edward P. Jorde, Cottage Pl.; Box 103, Granite Springs, N.Y. 10527

[21] Appl. No.: 957,803

[22] Filed: Oct. 8, 1992

[51] Int. Cl.$^5$ ............................................. B30B 15/00
[52] U.S. Cl. ................................ 156/583.1; 156/583.4;
156/293; 156/211; 156/212; 156/443; 156/476; 144/345
[58] Field of Search ............... 156/583.1, 293, 583.4, 156/212, 443, 475, 211, 212, 476; 144/348

[56] References Cited

U.S. PATENT DOCUMENTS

| | | | |
|---|---|---|---|
| 2,651,350 | 11/1947 | Casey | 156/583.4 |
| 3,541,592 | 11/1970 | Lewis | 156/212 |
| 3,578,535 | 7/1971 | Gohlfenneu | 156/583.3 |
| 3,998,679 | 12/1976 | Gwynne | 156/42 |
| 4,079,570 | 3/1978 | Rucker | 156/583.4 |
| 4,160,689 | 7/1979 | Altermatt | 156/583.4 |
| 4,238,665 | 12/1980 | Tremarco | 219/238 |
| 4,284,466 | 8/1981 | Chayka | 156/583.1 |
| 4,302,275 | 11/1981 | Burmeister | 156/446 |
| 4,351,069 | 9/1982 | Ballintyn | 3/1.912 |
| 4,779,390 | 10/1988 | Repper | 52/222 |
| 4,851,070 | 7/1989 | Shimada | 156/293 |

FOREIGN PATENT DOCUMENTS

| | | | |
|---|---|---|---|
| 2547529 | 12/1984 | France | 156/583.1 |
| 0052179 | 4/1979 | Japan | . |
| 0130734 | 10/1980 | Japan | 156/475 |
| 3027233 | 2/1988 | Japan | 156/583.1 |

*Primary Examiner*—W. Gary Jones
*Assistant Examiner*—Mark DeSimone
*Attorney, Agent, or Firm*—Joseph B. Taphorn

[57] ABSTRACT

A portable, compact, light weight, machine for gluing a flexible veneer strip in a groove of a work piece. The gluing machine includes an aluminum housing having a chamber in which an electrical heating tape obtains. The housing is mounted on a base of wood though separated therefrom by a commercially-available BACALITE heat insulating strip. The user is protected from the heated housing by side strips of BACALITE. A slot in the bottom of the housing mounts a readily interchangeable, high-heat transfer bar whose free edge has a surface complementary to that of the groove in which a veeneer is to be fixed. Special side bars are employed for grooves have greater internal dimensions than their openings. A controller also mounted on the base may be utilized to regulate the heating tape.

3 Claims, 4 Drawing Sheets

PORTABLE GROOVE GLUING MACHINE

1. Field of the Invention

This invention relates to gluing machines, and particularly to a portable machine for gluing wood veneer in the shadow grooves of architectural and furniture designs.

2. Background

Modern architectual and furniture designs favor the shadow effect: that is a design wherein a shadow exists, frequently near an edge. The shadow is formed by a groove, the groove being of sufficient depth that the recessed area is less lighted and hence reflects a shadow. Grooves are also formed in furniture doors and drawers; the upper or lower surface of the groove may have finger indents for pulling the doors or drawers open.

With the even invreasing scarcity of good hard wood and concern for the environment, architectural and furniture designs usually involve a base of chip core or particle board that is covered with a veneer to give a hard wood appearance. Covering with veneer includes insertion of the veneer into the grooves, too.

3. Prior Art

Machines for gluing veneer into a groove exist. Unfortunately they are large and bulky, and do not lend themselves to gluing veneer into individualy constructed architectural and furniture designs having the desired veneer of particular customers. Patents to Brock (U.S. Pat. No. 568,158) and to Brock et al (U.S. Pat. No. 568,155) show such machines. In Block, a series of presser strips having conforming surfaces are moved against a veneer on a molding. In Block et al, the groove of a board, after glue wetting and veneer placement, is forced upon a rib to seat the veneer against the upper surface of the groove. The machines are stationary ones and the work piece is moved to the machine in a factory. Such machines are eminently unfitted for customized work in an architectural construction or a furniture dealer's workshop.

SUMMARY OF THE INVENTION

Accordingly, it is an object of the invention is to provide a machine for gluing a selected veneer into grooves of architectural and furniture designs.

Another object of the invention is to render easy the installation of veneer in architectural and furniture desings.

A further object to the invention is to provide a groove veneer gluing machine that is portable, and hence transportable to the work.

A still further object of the invention is to provide a groove veneer gluing machine that is compact, and thus does not take up much storage space.

Still another object of the invention is to provide a groove veneer gluing machine that is simple of construction and and inexpensive of manufacture.

The objects of the invention are accomplished by a portable gluing machine having a removable, heated gluing bar that forces a veneer strip stetched over a work piece groove having a complementary surface into the groove wet with glue, is left in place until the glue sets, and then is moved along the groove to next length of it to repeat the process.

The base part of the machine is formed of support material such as a block of multi-ply wood; the heating portion includes an aluminum housing separated from the block of wood by a strip of insulating material such as BACALITE and from the user by external strips of the insulating material. The aluminium housing is hollowed out to provide a chamber for holding a heating tape, and its bottom surface has a slot in it for receiving and holding the gluing bar.

A feature of the invention is that different-shaped gluing bars for grooves of complementary surfaces, may be readily substituted. A temperature controller may be mounted on the wood block to enable the desired temperature to be set.

An advantage of the invention is that it can be readily used with crossing grooves.

Another advantage of the invention is that it can be readily moved in any direction, make veneering much free-er.

BRIEF DESCRIPTION OF THE SEVERAL VIEWS OF THE DRAWING

These and other objects, features and advantages of the invention will become apparent from a reading of the following description of an embodiment of the invention, when considered with the appended drawings wherein.

DETAILED DESCRIPTION OF A PREFERRED EMBODIMENT OF THE INVENTION

Figure 1:
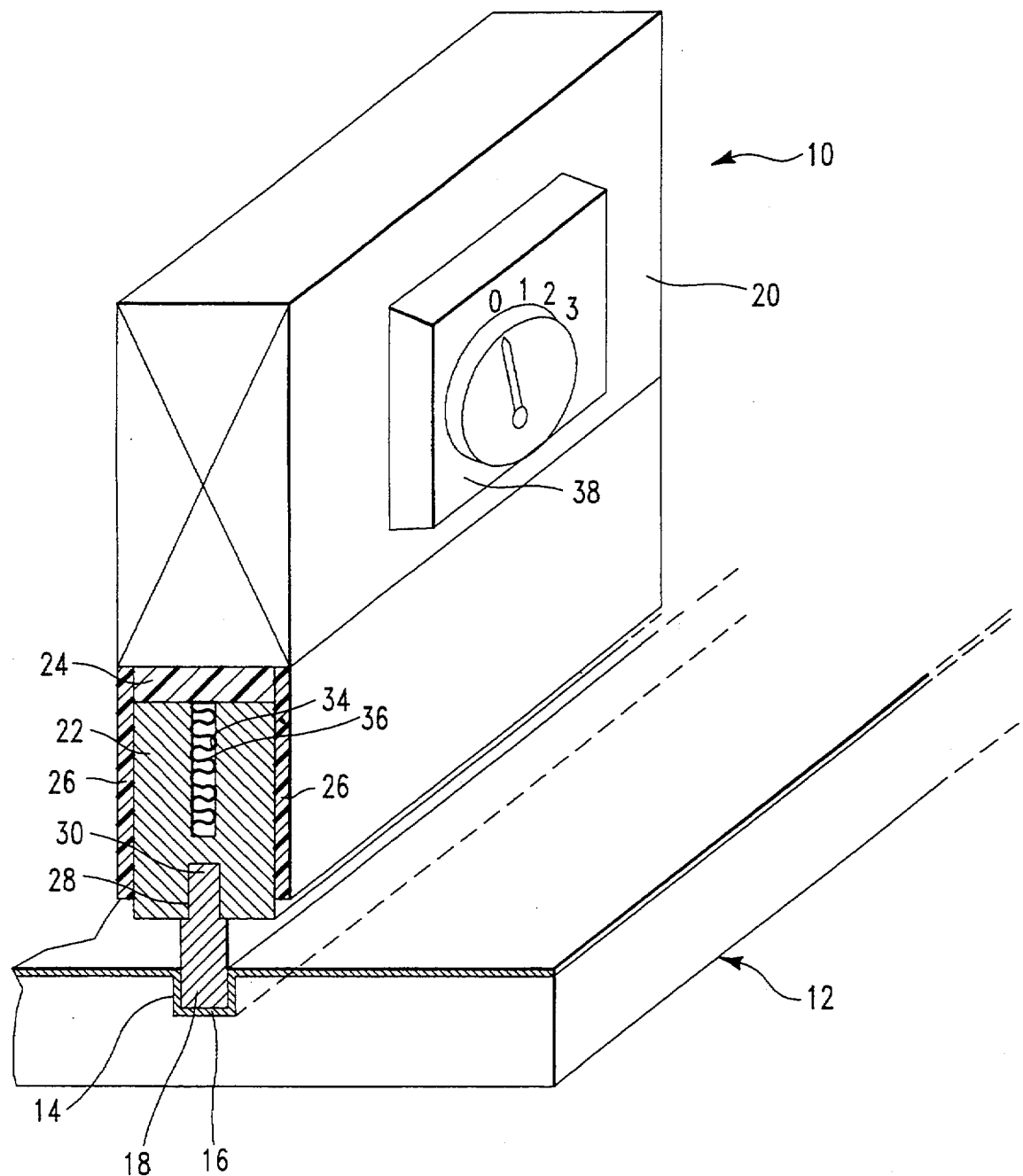
FIG. 1 is a schematic view of a portable gluing machine according to the invention, shown with its gluing bar being held in operational relationship in a groove in a work piece to be veneered.

Referring now more particularly to the drawings, FIG. 1 shows a portable gluing machine generally indicated by the numeral 10 and a workpiece 12 having a groove 14 with a flexible veneer strip 16 forced into it by a high-heat transfer gluing bar 18, of steel or the like, of the gluing machine 10.

The portable gluing machine 10 (FIGS. 1 and 2) includes a base support or block 20 for grasping and moving the gluing machine. On its bottom part it mounts by conventional means a light weight, high heat-transferring aluminum housing 22 that is separated from it by a sheet of heat-insulating material 24 such as BACALITE. The two sides of the housing too are each covered with a sheet 26 of BACALITE to protect a user from being burned by the heated aluminum housing 22. A slot 28 is cut lengthwise of the housing 22 in its bottom surface and receives an extension 30 of the gluing bar 18; it is held therein by set screw 32 (FIG. 2) threaded through a side of the aluminum housing.

The aluminum housing 22 has also a chamber 34 cut lengthwise in its upper surface. The chamber is of a dimension to receive an electrical heating tape 36 for heating the aluminum housing 22 and thence the gluing bar 16 through its extension 30 sufficiently to set the wet glue behind the veneer 16 in the work-piece groove 14. A conventional controller 38 is electrically connected with the heating tape to allow selection of desired heat levels.

Figure 2:
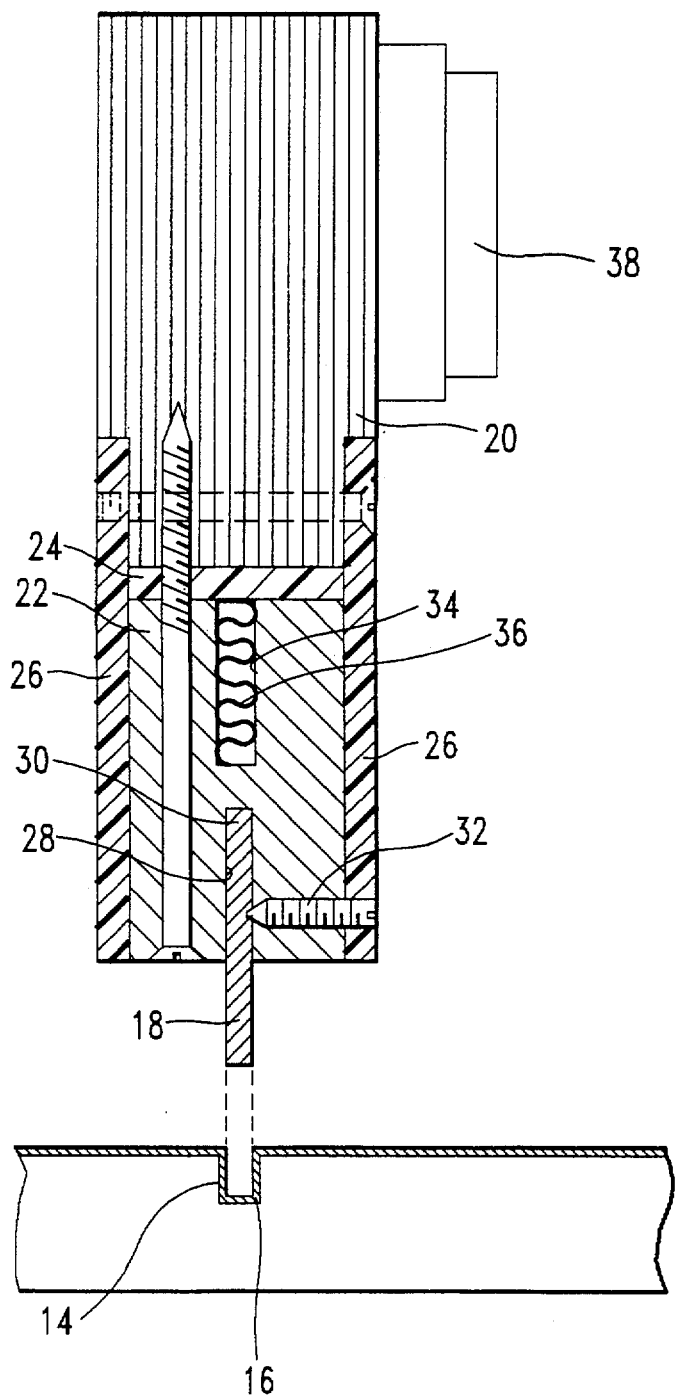
FIG. 2 is an end elevational view of the portable gluing machine and shown in spaced relationship to a work piece having a groove in it to be veneered.
Figure 3:
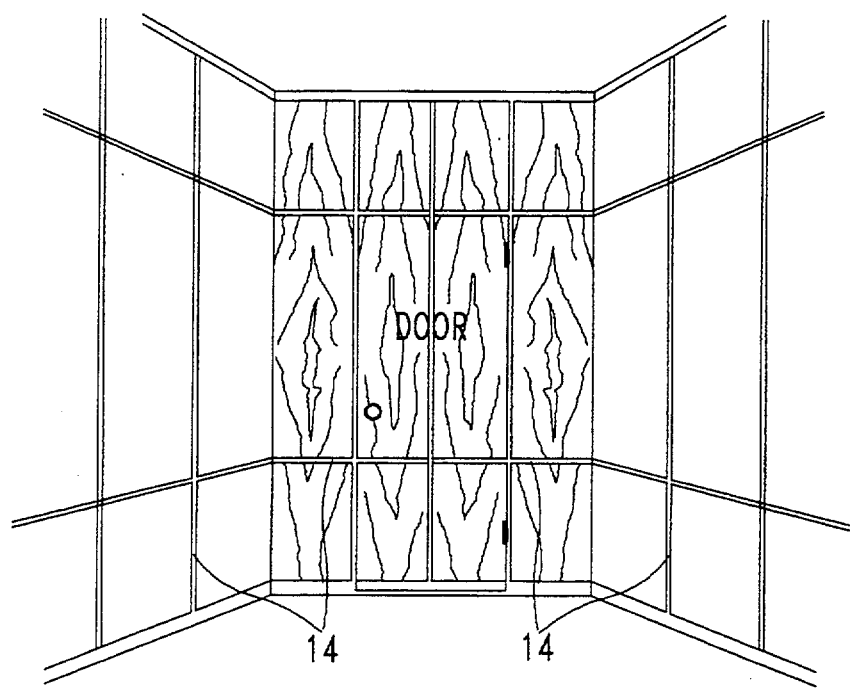
FIG. 3 is a view in perspective of an architectural design embodying shadow grooves.

The groove 14 is shown in FIGS. 1 and 2 as existing in the upper surface of a work piece lying flat upon a suitable support. FIG. 3 shows the shadow grooves 14 in an architectural design, namely the walls 32 of a room. It also shows crossing grooves.

Figure 4:
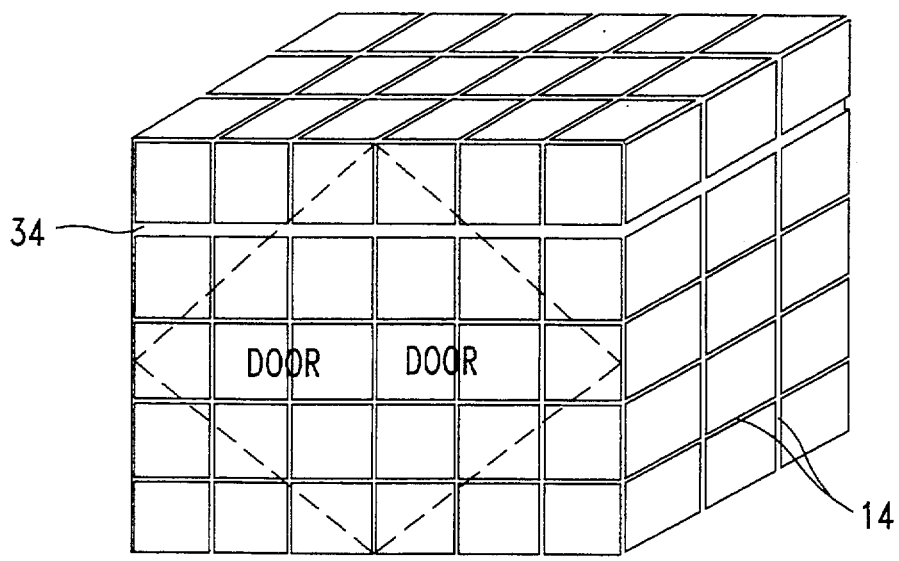
FIG. 4 is a view in perspective of a furniture design embodying shadow grooves which are also used as finger pulls for doors.
Figure 5A:
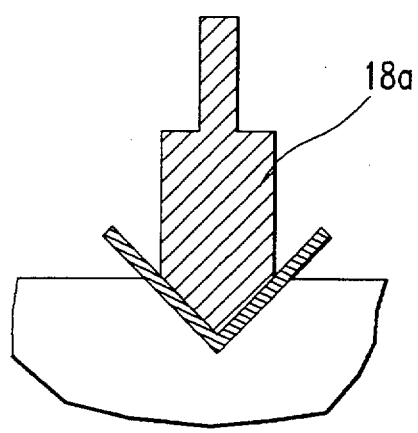
FIGS. 5(a)–(d) shows a series of gluing bars having different profiles.
Figure 5B:
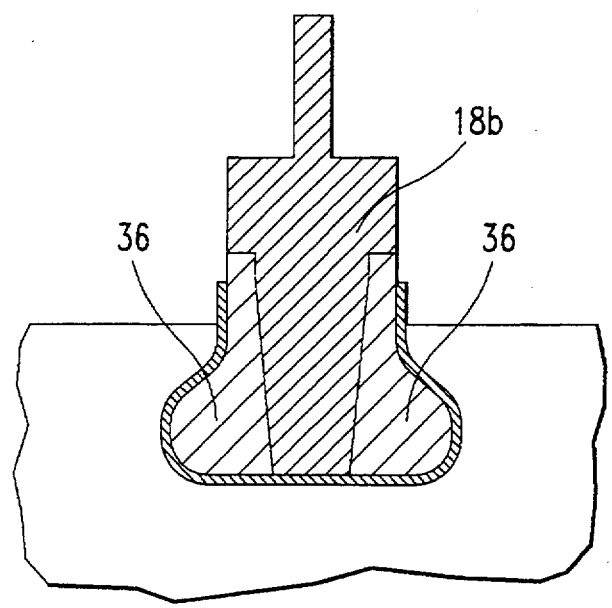
Figure 5C:
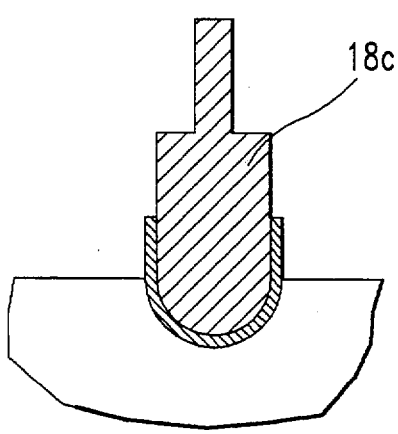
Figure 5D:
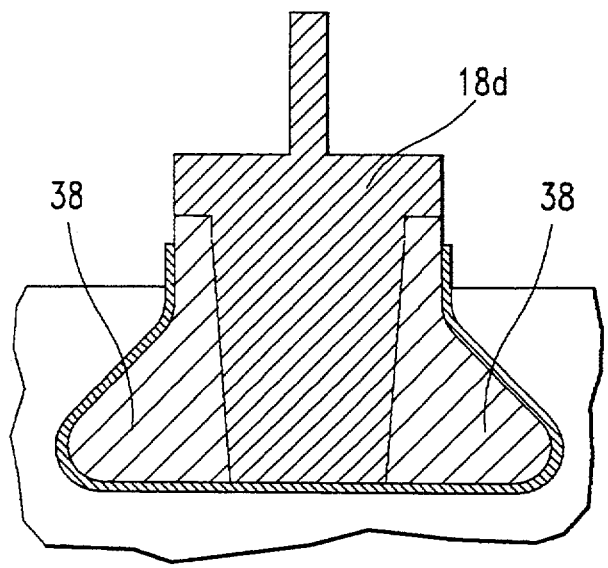

FIG. 4 shows the shadow grooves 14 in two different dimensions: groove 14 being employed for regular shadow effect, and groove 34 being larger to provide also among other purposes finger space for pulling doors or drawers open. It too shows crossing grooves.

FIG. 5 shows a series of interchangeable gluing bars 18. Gluing bar 18a employs a V-shaped tip on its lower edge to fit into a V-shaped groove. Gluing bar 18b employes a thinner and tapered tip on its lower edge to fit in-between two high heat transferring side bars 36 previously pressed into a groove having greater internal dimensions than its opening. Gluing bar 18c employes a rounded tip on its lower edge to fit into a semi-cylindrical groove. Gluing bar 18d employs a larger tapered tip on its lower edge to fit in-between two larger high heat transferring side bars 38 in a larger groove.

In use, the controller may be first adjusted to turn on the heating element 36 to warm up the gluing machine and its gluing bar 18. The groove 14 in the work piece 12 may then be wet with glue and a strip of commercially available flexible veneer 16 stretched across the length of the groove 14 and so as to straddle it. The now heated gluing bar 18 of the portable gluing machine 10 would be placed above the groove and the veneer strip pushed into it by the bar 18 so as to be embraced by the veneer strip which also embraces on its other and outer side the inside surfaces of the groove, by suitable manual handling of the gluing machine. The machine and bar would be left in place a time sufficient to set the glue and freeze the veneer to the insides of the groove. The gluing machine may then be moved to another place on the groove or to another groove. Projecting edges of the veneer strip, such as those best seen in FIGS. 5(a)-(d), are suitably trimmed.

It will be apparent that applicant has provided an efficient, compact, portable gluing machine that is movable in any direction, and one that can be readily used to veneer crossing groves. It is simple of construction and easy and inexpensive of manufacture.

While applicant has shown a preferred embodiment of the invention, it will also be appreciated that other and different applications of the principles of the invention will be apparent to those skilled in the art, and that therefore it is intended to be limited only by the scope of the spirit of the following claims.

What is claimed is:

1. In a portable machine for gluing veneer in a groove in a work piece, a manually-movable housing of a high heat-transferring material, a heating element in said housing, a high-heat transfer bar mounted on said housing for insertion into a veneer-covered glue-wetted groove, and a heat transferring side bar in the groove that is heated by the high-heat transfer bar.

2. In a portable machine for gluing veneer in a groove in a work piece, a manually-movable housing of a high heat-transferring material, a heating element in said housing, a high-heat transfer bar mounted on said housing for insertion into a veneer-covered glue-wetted groove, and high-heat transferring side bars in the groove that is heated by the high-heat transfer bar.

3. A portable gluing machine according to claim 2, wherein the side bars have external shapes complementary to the surfaces they engage.

* * * * *